United States Patent
Polyudov

(10) Patent No.: US 7,974,987 B1
(45) Date of Patent: *Jul. 5, 2011

(54) DATABASE FOR STORING DEVICE HANDLE DATA IN AN EXTENSIBLE FIRMWARE INTERFACE ENVIRONMENT

(75) Inventor: Feliks Polyudov, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/776,926

(22) Filed: May 10, 2010

Related U.S. Application Data

(63) Continuation of application No. 11/495,215, filed on Jul. 28, 2006, now Pat. No. 7,743,072.

(51) Int. Cl.
*G06F 17/30* (2006.01)

(52) U.S. Cl. ........ 707/790; 707/791; 707/800; 707/801; 713/2

(58) Field of Classification Search .................. 707/709, 707/791, 800, 801; 713/2
See application file for complete search history.

(56) References Cited

U.S. PATENT DOCUMENTS

| | | | |
|---|---|---|---|
| 6,578,131 B1 | 6/2003 | Larson et al. | |
| 6,606,628 B1 | 8/2003 | Monsen et al. | |
| 6,948,094 B2 | 9/2005 | Schultz et al. | |
| 6,988,180 B2* | 1/2006 | Kadatch | 711/216 |
| 7,260,848 B2* | 8/2007 | Zimmer | 726/27 |
| 7,373,366 B1 | 5/2008 | Chatterjee et al. | |
| 7,555,773 B2 | 6/2009 | Garg et al. | |
| 7,562,200 B1 | 7/2009 | Chatterjee et al. | |
| 7,743,072 B2* | 6/2010 | Polyudov | 707/790 |
| 2002/0169979 A1* | 11/2002 | Zimmer | 713/200 |
| 2003/0188173 A1* | 10/2003 | Zimmer et al. | 713/189 |

OTHER PUBLICATIONS

U.S. Official Action dated Sep. 18, 2009, in U.S. Appl. No. 11/495,215.
U.S. Notice of Allowance/Allowability dated Feb. 16, 2010 in U.S. Appl. No. 11/495,215.
Specification entitled, Intel Platform Innovation Framework for EFI Driver Execution Environment Core Interface Specification (DXE CIS), dated Dec. 8, 2004, pp. 1-220, Vers 0.91.

* cited by examiner

*Primary Examiner* — Jean M Corrielus
(74) *Attorney, Agent, or Firm* — Hope Baldauff Hartman, LLC

(57) ABSTRACT

Methods, apparatus, and computer-readable media for providing a device handle database in an EFI environment are disclosed. According to one method, a device handle database is created for storing data identifying the protocols that have been installed on one or more device handles. The database includes a sorted array of elements utilized to store protocol data for a family of protocols having the same GUID. Each element in the array comprises a family data structure including a field for storing the GUID for the family along with a field for storing a pointer to a linked list that stores the protocol instance data for each of the protocols in the family. Each node in the linked list is also a member of a linked list for storing protocol data for all of the protocols installed on a given device handle.

17 Claims, 7 Drawing Sheets

DATABASE FOR STORING DEVICE HANDLE DATA IN AN EXTENSIBLE FIRMWARE INTERFACE ENVIRONMENT

CROSS-REFERENCE TO A RELATED APPLICATION

This patent application is a continuation of U.S. patent application Ser. No. 11/495,215, entitled "Database for Storing Device Handle Data In An Extensible Firmware Interface Environment," filed Jul. 28, 2006, now U.S. Pat. No. 7,743,072, which is expressly incorporated herein by reference in its entirety.

BACKGROUND

In many computing systems, low-level instruction code is used as an intermediary between the hardware components of the computing system and the operating software and other high-level software executing on the computing system. In some computer systems, this low-level instruction code is known as the Basic Input and Output System ("BIOS"). The BIOS provides a set of software routines that allow high-level software to interact with the hardware components of the computing system using standard calls.

Because of limitations of the BIOS in many PC-compatible computers, a new firmware architecture for booting the computer and for intermediating the communication between the operating system and the hardware has been created. The new architecture is defined via a set of specifications. One of the specifications is called the Extensible Firmware Interface ("EFI") Specification and is available from INTEL CORPORATION. The original EFI Specification from INTEL CORPORATION is also being extended by the Unified Extensible Firmware Interface Forum ("UEFI").

The EFI Specification describes an interface between the operating system and the system firmware. In particular, the Specification defines the interface that platform firmware must implement and the interface that the operating system may use in booting. How the firmware implements the interface is left up to the manufacturer of the firmware. The EFI Specification provides mechanisms for EFI drivers to communicate with each other, and the EFI core provides functions such as allocation of memory, creating events, setting the clock, and many others. This is accomplished through a formal and complete abstract specification of the software-visible interface presented to the operating system by the platform and the firmware.

Additional details regarding the EFI and UEFI firmware architecture are defined by the group of specifications called INTEL Platform Innovation Framework for EFI ("the Framework"), which are available from INTEL CORPORATION. Unlike the EFI Specification, which focuses only on programmatic interfaces for the interactions between the operating system and system firmware, the Framework defines programmatic interfaces for performing the full range of operations that are required to initialize the platform from power on through transfer of control to the operating system.

The Framework defines two major execution phases: Pre-EFI Initialization ("PEI") and the Driver Execution Environment ("DXE"). The PEI phase includes the minimum amount of program code needed to perform basic platform initialization and is executed from non-volatile memory. When the PEI phase has completed its initialization, including the initialization of main memory, control passes to the DXE phase, which performs higher-level platform initialization and diagnostic functions.

The DXE phase is controlled by core code called the DXE foundation. The DXE foundation is a boot service image that is responsible for producing EFI boot services, EFI runtime services, and DXE services. The DXE foundation includes a DXE dispatcher that discovers DXE drivers stored in firmware volumes and executes them in the proper order. The DXE drivers are the components that actually initialize the platform and provide the services required to boot an EFI-compliant operation system or a set of EFI-compliant system utilities. The DXE drivers can also expose services, called protocols, which can be utilized by other DXE drivers.

In order to permit the discovery and utilization of protocols provided by DXE drivers, the DXE foundation maintains a device handle database that contains data regarding the installed protocols and the hardware devices with which they are associated. Other DXE drivers can utilize EFI boot services to look up the available protocols provided by other DXE drivers in the handle database. While the Framework indicates that the DXE foundation should maintain a handle database for storing data identifying the device handles and their installed protocols, the Framework does not, however, define how the device handle database should be implemented.

It is with respect to these considerations and others that the various embodiments of the invention have been made.

SUMMARY

The above and other problems are solved by methods, apparatus, and computer-readable media for providing a device handle database in an EFI environment. As described herein, a device handle database and methods for maintaining and accessing same are provided that allow quick access to installed protocols based upon either the globally unique identifier ("GUID") associated with the protocol or upon the device handle upon which the protocol is installed.

According to one aspect of the disclosure presented herein, a method is provided for creating a device handle database in an extensible firmware interface environment. In particular, a device handle database is created for storing data identifying the protocols that have been installed on one or more device handles. A device handle (or "handle") is a unique identifier corresponding to a device.

According to aspects, the device handle database includes an array of elements. Each element in the array is utilized to store protocol data for a family of protocols. A family of protocols is a group of protocol instances, each of which has the same GUID. The array of elements may be sorted based upon the GUID of each family to enable the quick location of any protocol family, and any protocol instance within the family, using a binary search algorithm.

In one implementation, each element in the array comprises a family data structure. The family data structure includes a field for storing the GUID for the family along with a field for storing a pointer to a linked list. The linked list stores the protocol instance data for each of the protocols in the family. According to aspects, the linked list includes one or more nodes. Each node corresponds to a protocol instance in the family. Each node may include a field for storing a pointer to a protocol interface for a protocol instance and a field for storing a pointer to the family data structure for the protocol family. Each node may also include a field for storing a pointer to a device handle data structure identifying the device handle upon which the protocol is installed, a field for storing a link to a next node in the linked list for the family, and a field for storing a link to a next node in a linked list of nodes corresponding to protocols that have been installed on the same device handle.

According to another method provided herein, a first linked list is generated that has one or more nodes. Each node in the first linked list is utilized to store protocol instance data for a protocol having the same GUID as other nodes in the first linked list. A second linked list is also created from the nodes. Each of the nodes in the second linked list stores data for a protocol installed on the same device handle as other nodes in the second linked list. Each of the nodes participates in a first linked list and in a second linked list. In this manner, any protocol instance can be located based upon either the GUID or the device handle upon which the protocol has been installed.

According to aspects, each node may further include a field for storing a pointer to a family data structure. The family data structure includes a field for storing the GUID for the protocols in the family and a field for storing a pointer to the first linked list. The family data structures may be stored in an array. The array may be sorted based upon the GUID of each family to permit the quick access to any protocol based on the GUID.

According to other aspects, each node may further include a field for storing a pointer to a device handle data structure. The device handle data structure includes a field for storing a pointer to the second linked list. Each node may also include a field for storing a link to a next node in the first linked list and a field for storing a pointer to a next node in the second linked list.

According to even other aspects, a computer-readable medium is provided that has a data structure stored thereon, the data structure for use in storing a device handle database in an EFI environment. In particular, the data structure includes one or more first linked lists. Each of the first linked lists has nodes corresponding to installed protocols having an identical globally unique identifier (GUID). The data structure also has one or more second linked lists. Each of the second linked lists has one or more nodes corresponding to protocols installed on the same device handle. Each of the nodes participates in a first linked list and a second linked list.

The data structure may further include a sorted array of elements. Each of the elements in the array is used to store a family data structure. The family data structure includes a field for storing a GUID for one of the first linked lists and a field for storing a pointer to one of the first linked lists. The data structure may further include one or more device handle data structures. Each device handle data structure includes a field for storing a pointer to one of the second linked lists. Each of the nodes may include a field for storing a pointer to a protocol interface.

Aspects of the disclosure provided herein may also be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages will be apparent from a reading of the following detailed description and a review of the associated drawings.

DETAILED DESCRIPTION

Figure 1:
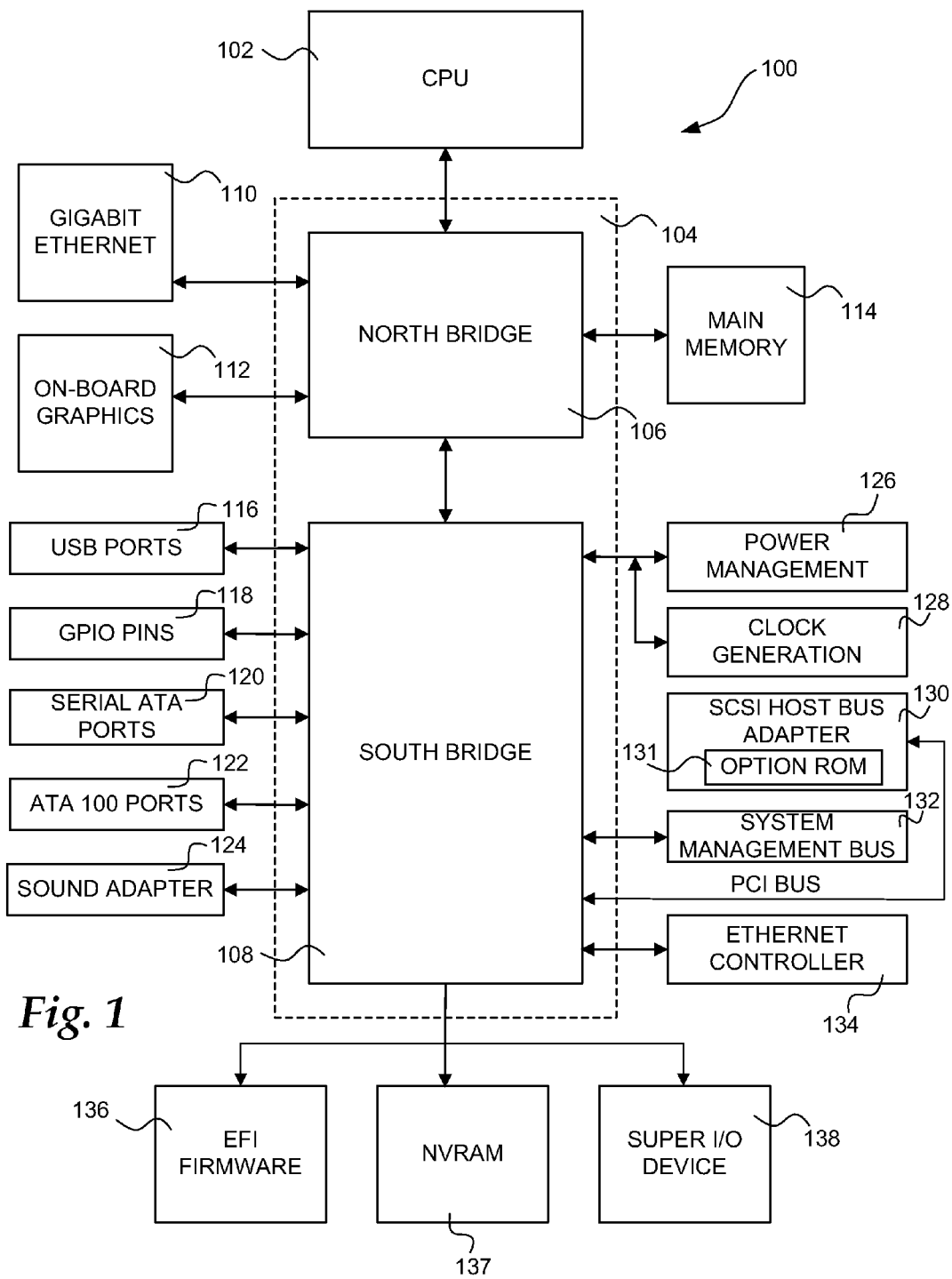
FIG. 1 is a computer architecture diagram that illustrates various components of a computer that provides an illustrative operating environment for the implementations presented herein.

Embodiments of the disclosure presented herein provide methods, systems, apparatus, and computer-readable media for providing and utilizing a device handle database. In the following detailed description, references are made to the accompanying drawings that form a part hereof, and in which are shown by way of illustration specific embodiments or examples. Referring now to the drawings, in which like numerals represent like elements throughout the several figures, aspects of an exemplary operating environment and the implementations provided herein will be described.

FIG. 1 and the following discussion are intended to provide a brief, general description of a suitable computing environment in which the invention may be implemented. While the invention will be described in the general context of program modules that execute in conjunction with the execution of a computer firmware, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for practicing the embodiments discussed herein will be described. It should be appreciated that although the embodiments described herein are discussed in the context of a conventional desktop or server computer, the embodiments may be utilized with virtually any type of computing device. FIG. 1 shows an illustrative computer architecture for a computer 100 that is operative to provide an EFI firmware that provides a DXE phase and that maintains a device handle database during the DXE phase.

In order to provide the functionality described herein, the computer 100 includes a baseboard, or "motherboard", which is a printed circuit board to which a multitude of components or devices may be connected by way of a system bus or other electrical communication path. In one illustrative embodiment, a central processing unit ("CPU") 102 operates in conjunction with a chipset 104. The CPU 102 is a standard central processor that performs arithmetic and logical operations necessary for the operation of the computer.

The chipset 104 includes a north bridge 106 and a south bridge 108. The north bridge 106 provides an interface between the CPU 102 and the remainder of the computer 100. The north bridge 106 also provides an interface to a random access memory ("RAM") used as the main memory 114 in the computer 100 and, possibly, to an on-board graphics adapter 112. The north bridge 106 may also include functionality for providing networking functionality through a gigabit Ethernet adapter 110. The gigabit Ethernet adapter 110 is capable of connecting the computer 100 to another computer via a network. Connections that may be made by the network adapter 110 may include local area network ("LAN") or wide area network ("WAN") connections. LAN and WAN networking environments are commonplace in offices, enterprise-wide computer networks, intranets, and the Internet. The north bridge 106 is connected to the south bridge 108.

The south bridge 108 is responsible for controlling many of the input/output functions of the computer 100. In particular, the south bridge 108 may provide one or more universal serial bus ("USB") ports 116, a sound adapter 124, an Ethernet controller 134, and one or more general purpose input/output ("GPIO") pins 118. The south bridge 108 may also provide a bus for interfacing peripheral card devices such as a BIOS boot system-compliant SCSI host bus adapter 130. In one embodiment, the bus comprises a peripheral component interconnect ("PCI") bus. The south bridge 108 may also provide a system management bus 132 for use in managing the various components of the computer 100. Power management circuitry 126 and clock generation circuitry 128 may also be utilized during the operation of the south bridge 108.

The south bridge 108 is also operative to provide one or more interfaces for connecting mass storage devices to the computer 100. For instance, according to an embodiment, the south bridge 108 includes a serial advanced technology attachment ("SATA") adapter for providing one or more SATA ports 120 and an ATA100 adapter for providing one or more ATA100 ports 122. The SATA ports 120 and the ATA100 ports 122 may be, in turn, connected to one or more mass storage devices storing an operating system and application programs. As known to those skilled in the art, an operating system comprises a set of programs that control operations of a computer and allocation of resources. An application program is software that runs on top of the operating system software and uses computer resources made available through the operating system to perform application specific tasks desired by the user.

The mass storage devices connected to the south bridge 108 and the SCSI host bus adapter 130, and their associated computer-readable media, provide non-volatile storage for the computer 100. Although the description of computer-readable media contained herein refers to a mass storage device, such as a hard disk or CD-ROM drive, it should be appreciated by those skilled in the art that computer-readable media can be any available media that can be accessed by the computer 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 108 for connecting a "Super I/O" device 138. The Super I/O device 138 is responsible for providing a number of input/output ports, including a keyboard port, a mouse port, a serial interface, a parallel port, and other types of input/output ports. The LPC interface may also connect a computer storage media such as a ROM or a flash memory such as a non-volatile random access memory ("NVRAM") for storing the firmware 136 that includes program code containing the basic routines that help to start up the computer 100 and to transfer information between elements within the computer 100. The EFI firmware 136 comprises a firmware that is compatible with the EFI Specification. Additional details regarding the operation of the EFI firmware 136 are provided below with respect to FIGS. 2-4. The LPC interface may also be utilized to connect a NVRAM 137 to the computer 100. The NVRAM 137 may be utilized by the firmware 136 to store configuration data for the computer 100. The configuration data for the computer 100 may also be stored on the same NVRAM 137 as the firmware 136.

It should be appreciated that the computer 100 may comprise other types of computing devices, including hand-held computers, embedded computer systems, personal digital assistants, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

Figure 2:
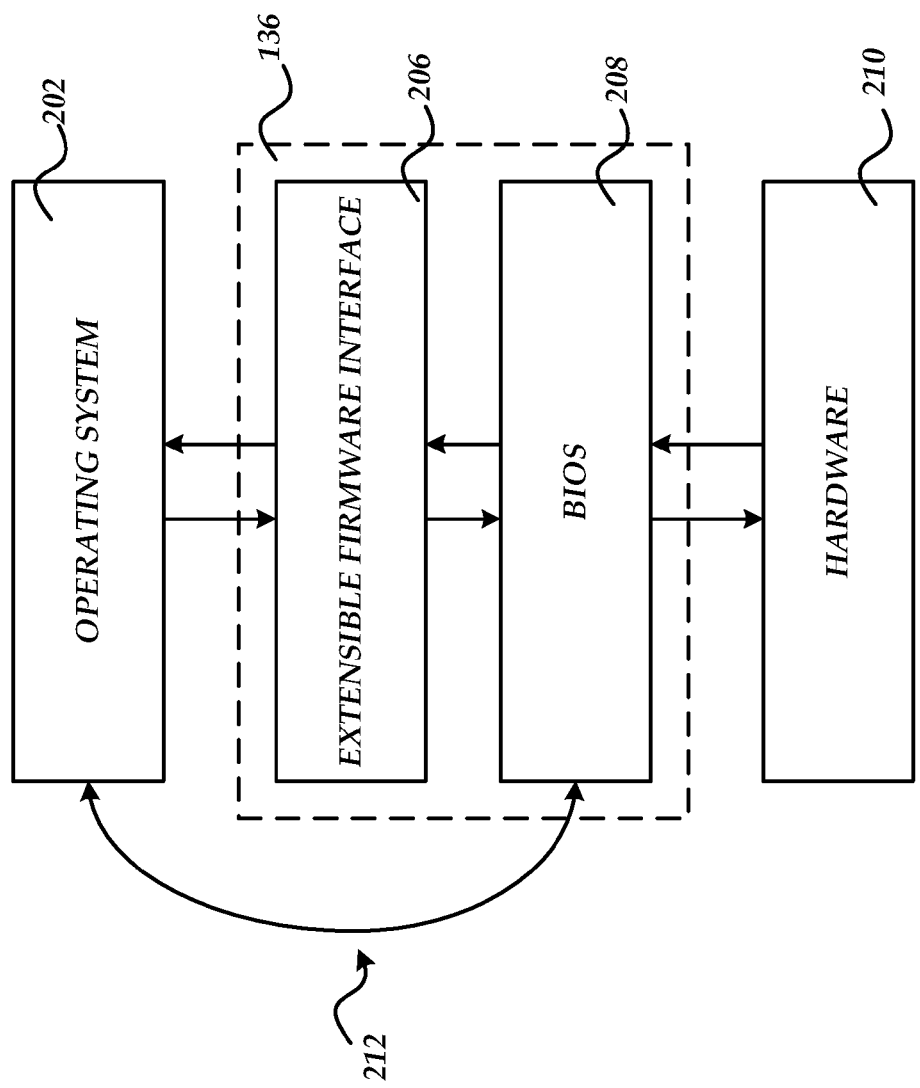
FIGS. 2 and 3 are software architecture diagrams that illustrate aspects of an EFI environment utilized by the embodiments presented herein.

Referring now to FIG. 2, additional details regarding the operation of the EFI firmware 136 of the computer 100 will be described. As described above, the firmware 136 comprises a firmware compatible with the EFI Specification from INTEL CORPORATION or from the UEFI FORUM. The EFI Specification describes an interface between the operating system 202 and the system firmware 136. The EFI Specification defines the interface that platform firmware must implement, and the interface that the operating system 202 may use in booting. How the firmware 136 implements the interface is left up to the manufacturer of the firmware. The intent of the Specification is to define a way for the operating system 202 and firmware 136 to communicate only information necessary to support the operating system boot process. This is accomplished through a formal and complete abstract Specification of the software-visible interface presented to the operating system by the platform and the firmware.

According to one implementation of EFI on INTEL CORPORATION IA-32 platforms, both the EFI 206 and a BIOS 208 may be presented in the firmware 136. This allows the computer 100 to support both firmware interfaces. In order to provide this functionality, an interface 212 may be provided for use by legacy operating systems and applications. Additional details regarding the architecture and operation of the EFI 204 are provided below with respect to FIGS. 3-4. Additional details regarding the operation and architecture of EFI can be found in the EFI Specification and in the Framework, both of which are available from INTEL CORPORATION end expressly incorporated herein by reference.

Figure 3:
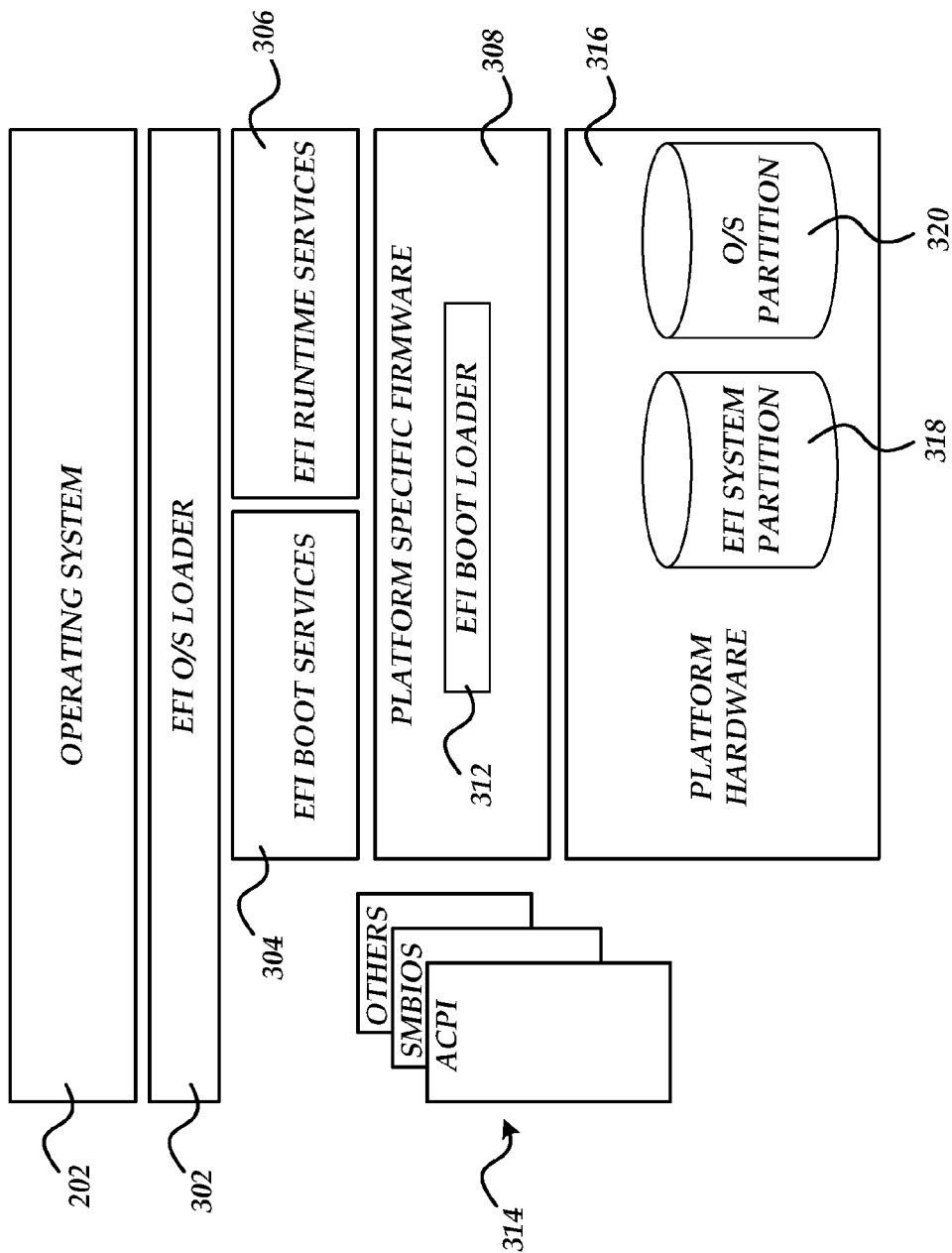

Turning now to FIG. 3, additional details regarding an EFI Specification-compliant system utilized to provide an operating environment for the various embodiments presented herein will be described. As shown in FIG. 3, the system includes platform hardware 316 and an operating system 202. The platform firmware 308 may retrieve an OS image from the EFI system partition 318 using an EFI O/S loader 302. The EFI system partition 318 may be an architecturally shareable system partition. As such, the EFI system partition 318 defines a partition and file system that are designed to allow safe sharing of mass storage between multiple vendors. An O/S partition 320 may also be utilized.

Once started, the EFI O/S loader 302 continues to boot the complete operating system 202. In doing so, the EFI O/S loader 302 may use EFI boot services 304 and interface to other supported specifications to survey, comprehend, and initialize the various platform components and the operating system software that manages them. Thus, interfaces 314 from other specifications may also be present on the system. For example, the Advanced Configuration and Power Management Interface ("ACPI") and the System Management BIOS ("SMBIOS") specifications may be supported.

EFI boot services 304 provides interfaces for devices and system functionality that can be used during boot time. EFI runtime services 306 may also be available to the O/S loader 302 during the boot phase. For example, a minimal set of runtime services may be presented to ensure appropriate abstraction of base platform hardware resources that may be needed by the operating system 202 during its normal operation. EFI allows extension of platform firmware by loading EFI driver and EFI application images which, when loaded, have access to all EFI-defined runtime and boot services.

Various program modules provide the boot and runtime services. These program modules may be loaded by the EFI boot loader 312 at system boot time. The EFI boot loader 312 is a component in the EFI firmware that determines which program modules should be explicitly loaded and when. Once the EFI firmware is initialized, it passes control to the boot loader 312. The boot loader 312 is then responsible for determining which of the program modules to load and in what order.

Figure 4:
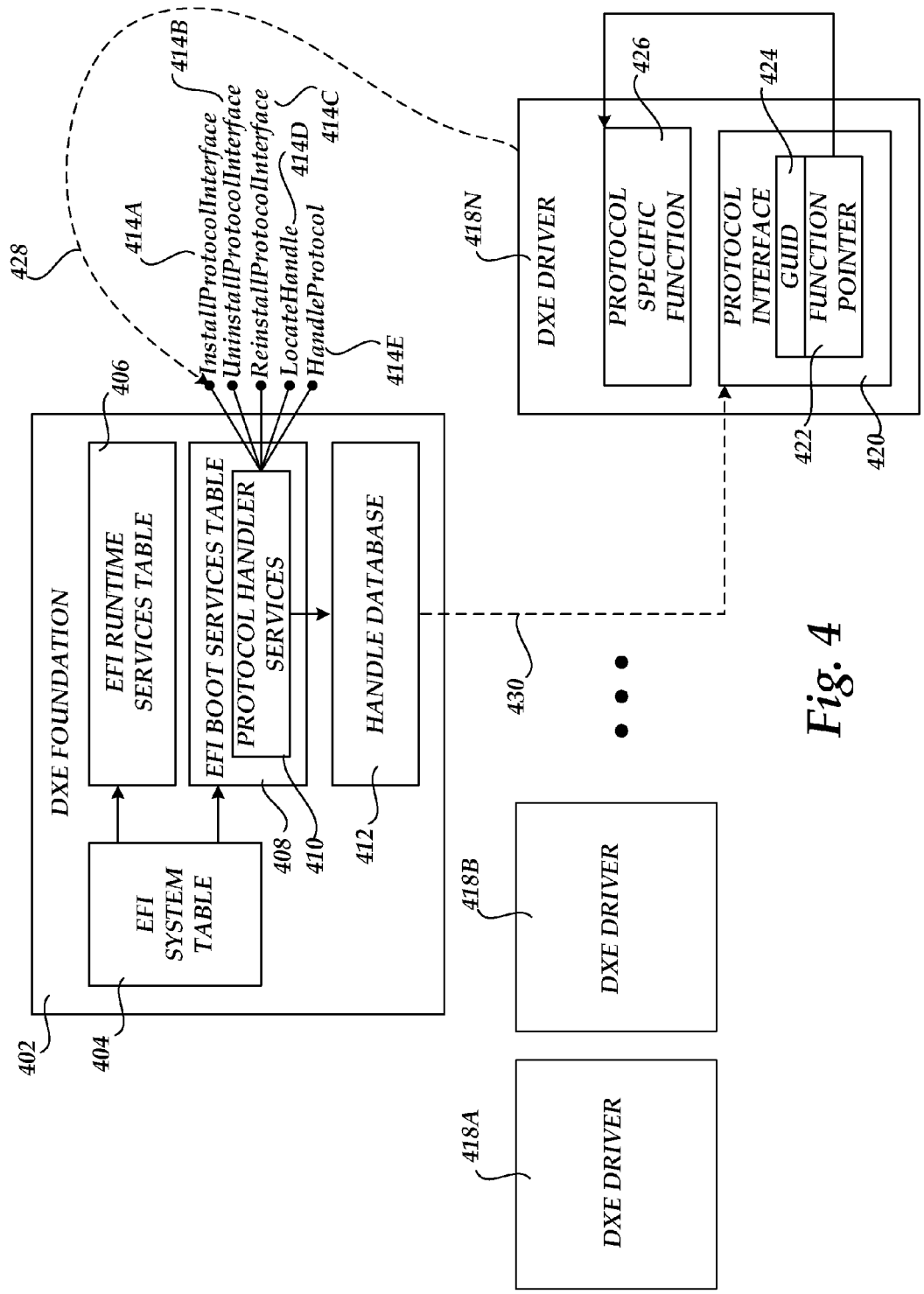
FIG. 4 is a software architecture diagram illustrating aspects of a DXE phase of operation that provides an operating environment for the embodiments described herein.

Referring now to FIG. 4, details regarding a DXE phase of execution will be provided. As discussed briefly above, the Framework is executed in two major phases: PEI and the DXE. PEI includes the minimum amount of program code needed to perform basic platform initialization and is executed from non-volatile memory. When PEI has completed its initialization, including the initialization of main memory, control passes to the DXE, which performs higher-level platform initialization and diagnostic functions.

FIG. 4 shows aspects of an illustrative DXE phase of execution. In particular, the operation of the DXE is controlled by core code called the DXE foundation 402. The DXE foundation 402 is a boot service image that is responsible for producing EFI boot services, EFI runtime services, and DXE services. The DXE foundation 402 is an implementation of EFI. The DXE foundation 402 includes a DXE dispatcher (not shown in FIG. 4) that discovers the DXE drivers 418A-418N stored in firmware volumes and executes them in the proper order.

The DXE drivers 418A-418N are required to initialize the processor, chipset, and platform. They are also required to produce DXE architectural protocols and any additional protocol services required to produce I/O abstractions and boot devices. The DXE drivers 418A-418N are the components that actually initialize the platform and provide the services required to boot an EFI-compliant operation system or a set of EFI-compliant system utilities. DXE drivers may consume EFI boot services, EFI runtime services, and DXE services to perform their functions. As will be described in greater detail below, DXE drivers may expose their services for use by other DXE drivers through the use of a protocol interface.

The EFI system table 404 is passed to every executable component in the DXE phase. The EFI system table 404 contains a pointer to the EFI boot services table 408 and the EFI runtime services table 406. It also contains pointers to the console devices and their associated I/O protocols. Services that are available through the EFI boot services table 408 include task priority services, memory services, event and timer services, image services, and driver support services. The EFI boot services table 408 also contains protocol handler services 410 to access the contents of the handle database 412. The handle database 412 is where protocol interfaces produced by the DXE drivers 418A-418N are registered. Moreover, the device handle database 412 contains data identifying the particular device handle upon which each protocol interface is installed. A device handle is a unique identifier corresponding to a device.

The DXE drivers 418A-418N can use the protocol handler services 410 to look up the services produced by other DXE drivers 418A-418N. In particular, the protocol handler services 408 provide services to add and remove device handles from the handle database 412. It also provides services to add and remove protocols from the device handles in the device handle database 412. Additional services are available that allow any component to look up handles in the device handle database 412, and open and close protocols in the device handle database 412. For instance, the InstallProtocolInterface service 414A installs a protocol interface on a device handle, the UninstallProtocolInterface service 414B removes a protocol interface from a device handle, the ReinstallProtocolInterface service 414C reinstalls a protocol interface on a device handle, the LocateHandle service 414D returns an array of handles that support a specified protocol, and the HandleProtocol service 414E queries a handle to determine if it supports a specified protocol (a pointer to the matching protocol interface structure is returned if it does). Other protocol handler services not shown in FIG. 4 are also set forth by the Framework.

As an example, the DXE driver 418A may desire to expose a protocol specific function 426. In order to expose the function 426 for use by other DXE drivers, the driver 418N makes a call 428 to the InstallProtocolInterface service 414A with the device handle upon which the protocol should be installed, the GUID 424, and a pointer to a protocol interface 420. The protocol interface 420 has a unique GUID 424. The protocol interface 420 includes a function pointer 422 to the protocol specific function 426. In response to such a call, data is added to the device handle database 412 that includes a pointer 430 to the protocol interface 420. In this manner, the contents of the driver handle database 412 are built dynamically through calls to the InstallProtocolInterface function. The data stored in the database 412 in response to these calls is utilized when requests are made to identify a particular protocol installed on a particular handle or for a protocol with a specified GUID. It should be appreciated that although the Framework indicates that the device handle database 412 should be provided during the DXE phase, the Framework does not provide any implementation details for the device handle database 412. An illustrative implementation of the device handle database 412 is described below with respect to FIGS. 5-7.

Figure 5:
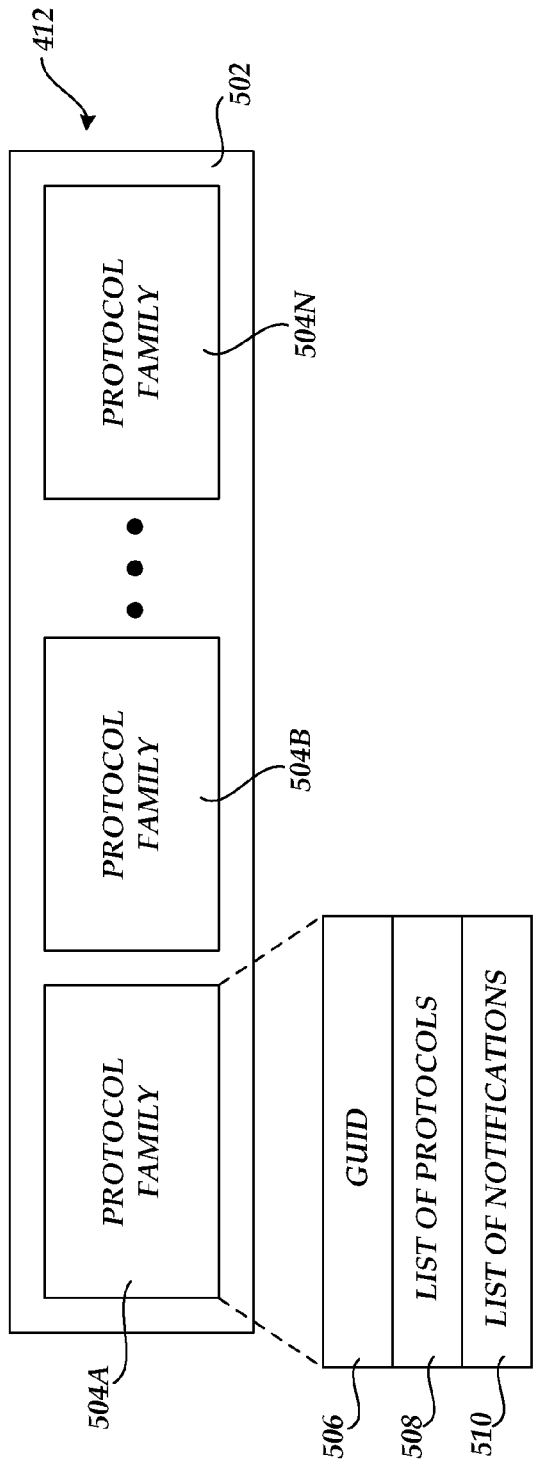
FIGS. 5-7 are data structure diagrams illustrating aspects of a device handle database provided herein.

Turning now to FIG. 5, additional details will be provided regarding an implementation of a device handle database 412 provided herein that is suitable for use in the DXE phase. In particular, according to one implementation, the device handle database 412 includes an array 502 of elements. Each element in the array 502 is utilized to store protocol data for a protocol family. A family of protocols is a group of protocol instances, each of which has the same GUID. The array 502 of elements may be sorted based upon the GUID of each protocol family to enable the quick location of any protocol family, and any protocol instance within the family, using a binary search algorithm. According to implementations, the array 502 is maintained in sorted order by inserting new elements in their sorted position based upon the GUID of the protocol family.

More particularly, according to one implementation, the device handle database 412 includes an array 502 of protocol family data structures 504A-504N. Each of the protocol family data structures 504A-504N stores protocol data for a family of protocol instances, each of which has the same GUID. Each protocol family data structure 504A-504N includes a field 506 for storing the GUID for the family along with a field 508 for storing a pointer to a linked list of protocol data structures. As will be described in greater detail below with respect to FIG. 6, the linked list of protocol data structures stores the protocol instance data for each of the protocols in the family referred to by the particular protocol family data structure 504.

As discussed briefly above, DXE drivers may also register to be notified when a protocol having a specified GUID is installed in the device handle database 412. In order to maintain data identifying the drivers that should be notified when a protocol is installed, the protocol family data structure 504 may also include a field 510 for storing a pointer to a linked list of notification data structures that are utilized for this purpose. Additional details regarding the notification data structures and their use are provided below with respect to FIG. 7.

Figure 6:
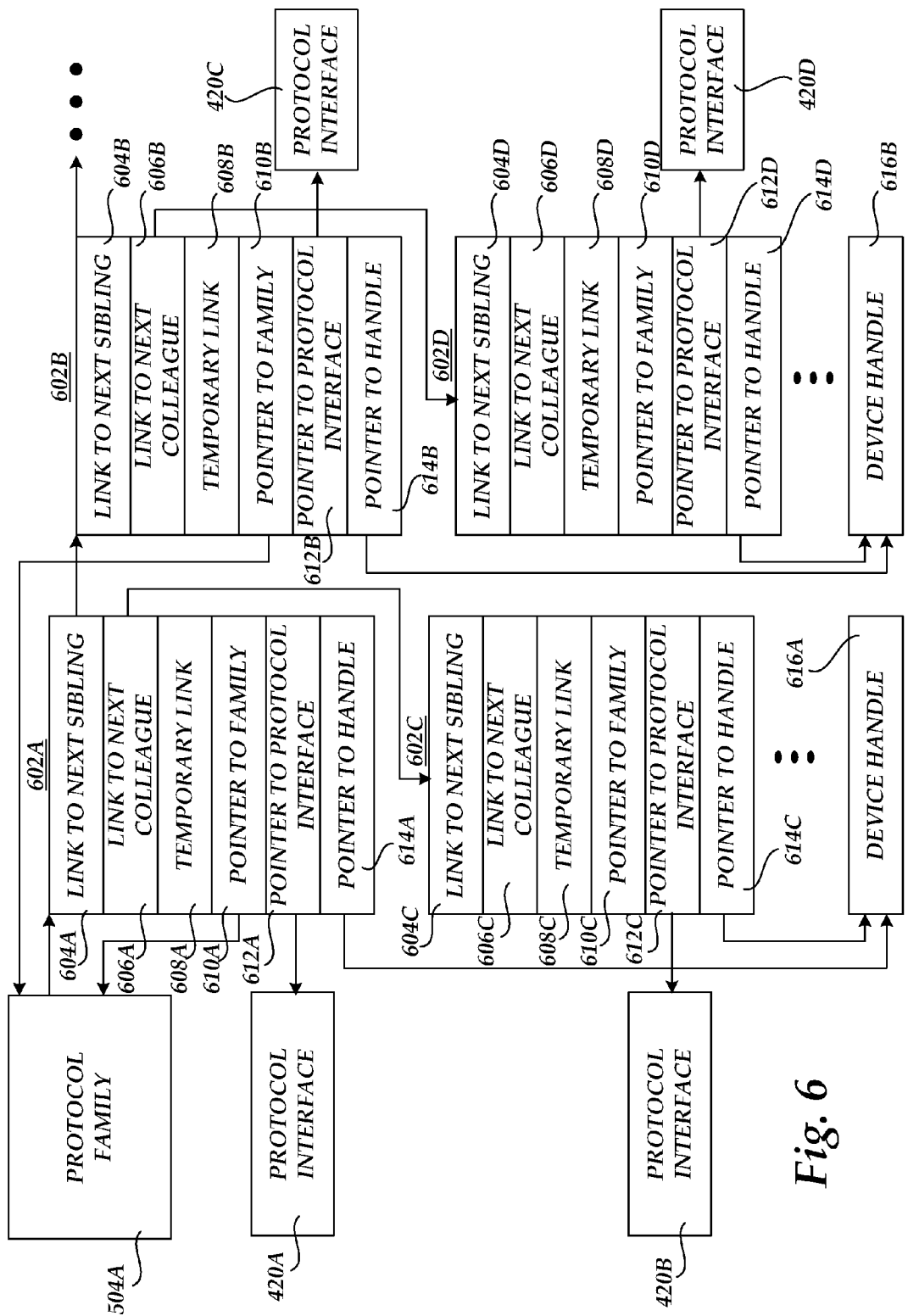

Turning now to FIG. 6, additional details will be provided regarding the structure and use of the device handle database 412. As discussed briefly above, each protocol family data structure 504 includes a field 508 for storing a pointer to a linked list of protocol data structures (also referred to herein as "nodes"). For instance, in the example database shown in FIG. 6, the protocol family data structure 504A includes a pointer to a protocol data structure 602A.

The protocol data structures 602 include a field 604 for storing a link to a sibling protocol data structure 602 in the linked list of protocol data structures. As used herein, the term sibling protocol data structure refers to another protocol data structure in the same protocol family (i.e. having the same GUID). For instance, the field 604A stores a link to the sibling protocol data structure 602B. In this manner, the protocol family data structure 504A acts as the head of a linked list of protocol data structures. In order to locate a specific protocol instance, the array 502 can be searched for the desired GUID. Once the GUID has been located, the list of protocol structures can be searched to locate the proper protocol instance.

Each of the protocol data structures 602 also includes a field 612 for storing a pointer to a protocol interface 420 for a protocol instance. For instance, the node 602A includes a field 612A storing a pointer to the protocol interface 420A for the protocol instance defined by the node 602A. A field 610 is also provided for storing a pointer back to the protocol family data structure 504 for the family. A field 608 is also provided for storing a temporary link. The field 608 is utilized to create temporary lists without copying the nodes 602. In this manner, a copy of the nodes 602 is never made, thereby avoiding synchronization issues.

As also shown in FIG. 6, each node 602 may also include a field 614 for storing a pointer to a device handle data structure 616. The device handle data structure 616 includes a data field for storing a pointer to a linked list of protocol data structures. For instance, the nodes 602A-602B have links stored in the fields 614A-614B, respectively, to the device handle data structure 616A. In this manner, data is stored indicating the device handle upon which each of the protocols is installed. In order to identify the device handle upon which a protocol is installed, these links may be followed to the appropriate device handle data structure 616.

Each node 602 also includes a field 606 for storing a link to a colleague node. As utilized herein, a colleague is a node that has been installed on the same device handle. For instance, the node 602A includes a field 606A for storing a link to the node 602C. In this manner, a second linked list is created between the nodes 602 that links each of the protocol data structures installed on a given device handle. To identify the protocols installed on a particular device handle, links may be followed from the device handle data structure 616 to each of the linked colleague nodes.

Therefore, in view of the above, it should be appreciated that the data structure provided herein comprises a first linked list that is utilized to store protocol instance data for protocols having the same GUID. The data structure also includes a second linked list that is also created from the nodes. Each of the nodes in the second linked list stores data for a protocol installed on the same device handle as other nodes in the second linked list. Each of the nodes participates in a first linked list a second linked list. It should further be appreciated that, although not shown in FIG. 6, each of the lists is doubly linked. In this manner, any protocol instance can be located based upon either the GUID stored in the protocol family data structure 504 or upon the device handle upon which the protocol has been installed stored in the device handle data structure 616.

Figure 7:
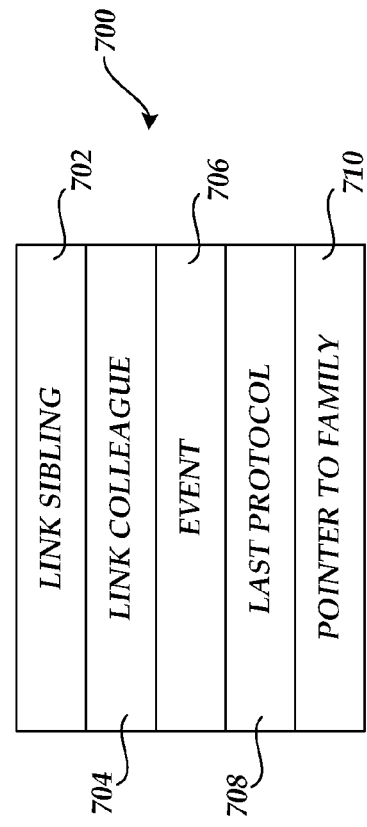

Turning now to FIG. 7, additional details will be provided regarding the notification data structures linked to by the field 510 in the protocol family data structure 504. As discussed briefly above, DXE drivers may register to be notified when a protocol having a specified GUID is installed in the device handle database 412. In order to maintain data identifying the drivers that should be notified when a protocol is installed, the protocol family data structure 504 may include a field 510 for storing a pointer to a linked list of notification data structures that are utilized for this purpose. FIG. 7 shows an illustrative notification data structure 700.

As shown in FIG. 7, the notification data structure 700 includes a field 702 for storing a link to a sibling notification data structure. A sibling notification data structure is another data structure for a notification about protocol with the same GUID. A field 704 is also provided for storing a link to a colleague notification data structure. A colleague notification data structure is a data structure for a notification for the same event. A field 706 is provided in the notification data structure for storing data identifying the event that triggers the notification. A field 708 is also provided for storing data identifying the protocol of which the notification consumer was last notified. The notification data structure 700 also includes a field 710 for storing a link to the protocol family data structure 504 for the family.

According to aspects, when a new protocol is installed in the device handle database 412, the linked list of notification data structures is traversed in order to identify the events for which a notification should be provided. Every identified event is signaled using SignalEvent service provided by DXE Foundation. SignalEvent schedules callback of the function associated with the event. The function is located inside of the DXE driver that requested notification. Once the function is called, DXE driver can use LocateHandle function to locate newly installed protocol instance. DXE Foundation function that registers notification requests returns special registration pointer back to the DXE driver. This pointer can be used with the locate function to locate newly installed protocol. The registration pointer is implemented as an address of the notification data structure. Last protocol data field of the notification structure is used to return proper protocol instance to the DXE driver. Proper instance can be located by following the sibling link of the protocol node pointed by the last protocol data field. Once protocol instance is returned to the DXE driver, the last protocol field is advanced to the next sibling node.

Figure 8:
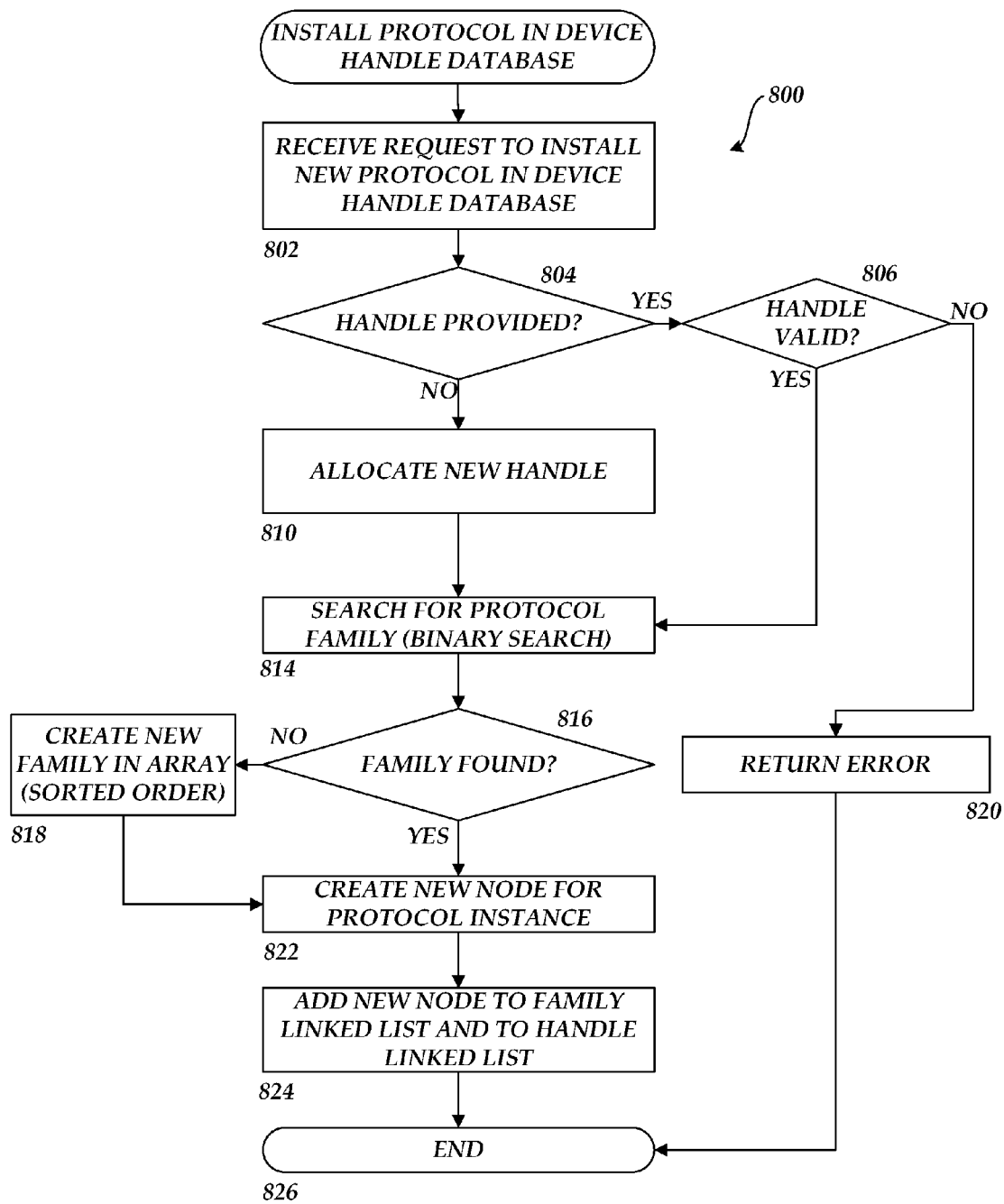
FIG. 8 is a flow diagram showing an illustrative process for installing a protocol in a device handle database provided herein.

Referring now to FIG. 8, an illustrative routine 800 will be described in detail for installing a protocol in a device handle database provided herein. The logical operations of the various embodiments described herein are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the embodiments described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 800 begins at operation 802, where a request is received to install a new protocol in the device handle database 412. As discussed above, the InstallProtocolInterface 414A may be utilized to perform this function. In particular, the InstallProtocolInterface 414A takes a GUID and a pointer to the protocol interface for the protocol to be installed. The device handle upon which the protocol is to be installed may or may not be provided. If, at operation 804, it is determined that the device handle was provided, the routine 800 branches from operation 804 to operation 806. At operation 806, a determination is made as to whether the provided handle is valid. If not, the routine 800 continues from operation 806 to operation 820, where an error is returned. If the provided handle is valid, the routine 800 continues from operation 806 to operation 814, discussed below.

If, at operation 804, it is determined that a handle was provided with the call to InstallProtocolInterface, the routine 800 continues from operation 804 to operation 810, where a new device handle is allocated. The routine 800 then continues from operation 810 to operation 814, where a search for a protocol family having the same GUID as the protocol to be installed is made. This is performed, for instance, by performing a binary search of the array 502 for a protocol family data structure having the specified GUID stored in the field 506. If a family having the specified GUID is not found, the routine 800 branches from operation 816 to operation 818, where a new family data structure is created in its sorted position in the array 502 for the specified GUID. Once the new protocol family data structure has been created in the array 502, the routine 800 continues from operation 818 to operation 822. If, at operation 816, a family data structure is located in the array 502 having the specified GUID, the routine 800 continues to operation 822.

At operation 822, a new node 602 is created for the new protocol instance. As described above, the new node includes a pointer to the protocol interface for the protocol instance and the other pointers shown in and described above with respect to FIG. 6. In particular, at operation 824, the new node is linked to the family data structure and the other sibling nodes in the linked list of nodes for the protocol family. The new node is also linked to the other nodes on the same device handle and to the device handle data structure. Once the fields of the new node have been populated, the protocol has been added to the device handle database 412. Accordingly, the routine 800 continues from operation 824 to operation 826, where it ends.

Based on the foregoing, it should be appreciated that embodiments described herein provide methods, systems, apparatus, and computer-readable media for providing a device handle database during the DXE phase of an EFI. Although the disclosure presented herein has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

I claim:

1. A computer-implemented method for creating a device handle database in an extensible firmware interface environment, the computer-implemented method comprising performing computer-implemented operations for:
   creating a device handle database for storing data identifying the device handles upon which one or more protocols have been installed, the device handle database comprising an array of elements, each element in the array of elements operative to store protocol data for a family of protocols having an identical globally unique identifier (GUID),
   wherein each element in the array comprises a family data structure, each family data structure including a field for storing the GUID for the family and a field for storing a pointer to a linked list for storing the protocol data for each of the protocols in the family.

2. The method of claim 1, wherein the linked list comprises one or more nodes, each node corresponding to a protocol in the family and having a field for storing a pointer to a protocol interface for the protocol and a field for storing a pointer to the family data structure for the linked list of protocols identified by the GUID.

3. The method of claim 2, wherein each node further comprises a field for storing a pointer to a device handle data structure identifying the device handle upon which the protocol is installed.

4. The method of claim 3, wherein each node further comprises a field for storing a link to a next node in the linked list for storing the protocol data for the protocols in the family.

5. The method of claim 4, wherein each node further comprises a field for storing a link to a next node in a linked list of nodes corresponding to protocols that have been installed on the same device handle.

6. The method of claim 5, wherein the array of elements is sorted based upon the GUID in the family data structure.

7. A computer-implemented method for creating a device handle database in an extensible firmware interface environment, the computer-implemented method comprising performing computer-implemented operations for:

generating a first linked list having one or more nodes, each node in the first linked list storing protocol data for a protocol having the same globally unique identifier (GUID) as other nodes in the first linked list; and generating a second linked list from the nodes, each of the nodes in the second linked list storing data for a protocol installed on the same device handle as other nodes in the second linked list, wherein each of the nodes participates in a first linked list and a second linked list, and wherein each node further comprises a field for storing a pointer to a family data structure, the family data structure including a field for storing the GUID and a field for storing a pointer to the first linked list.

8. The method of claim 7, wherein each node further comprises a field for storing a pointer to a device handle data structure, the device handle data structure including a field for storing a pointer to the second linked list.

9. The method of claim 8, wherein each node further comprises a field for storing a link to a next node in the first linked list and a field for storing a pointer to a next node in the second linked list.

10. The method of claim 9, further comprising providing an array having one or more elements, each of the elements operative to store a family data structure, the array being sorted by the GUID stored in each family data structure.

11. The method of claim 7, wherein the nodes in the first linked list are members of a family of protocols, and wherein the first linked list stores protocol data for each of the protocols in the family of protocols.

12. A computer-readable storage medium having computer readable instructions stored thereupon that, when executed by a computer, cause the computer to:

create a device handle database for storing data identifying the device handles upon which one or more protocols have been installed, the device handle database comprising an array of elements, each element in the array of elements operative to store protocol data for a family of protocols having an identical globally unique identifier (GUID), wherein each element in the array comprises a family data structure, each family data structure including a field for storing the GUID for the family and a field for storing a pointer to a linked list for storing the protocol data for each of the protocols in the family.

13. The computer-readable storage medium of claim 12, wherein the linked list comprises one or more nodes, each node corresponding to a protocol in the family and having a field for storing a pointer to a protocol interface for the protocol and a field for storing a pointer to the family data structure for the linked list of protocols identified by the GUID.

14. The computer-readable storage medium of claim 13, wherein each node further comprises a field for storing a pointer to a device handle data structure identifying the device handle upon which the protocol is installed.

15. The computer-readable storage medium of claim 14, wherein each node further comprises a field for storing a link to a next node in the linked list for storing the protocol data for the protocols in the family.

16. The computer-readable storage medium of claim 15, wherein each node further comprises a field for storing a link to a next node in a linked list of nodes corresponding to protocols that have been installed on the same device handle.

17. The computer-readable storage medium of claim 16, wherein the array of elements is sorted based upon the GUID in the family data structure.

* * * * *